Figure 3:
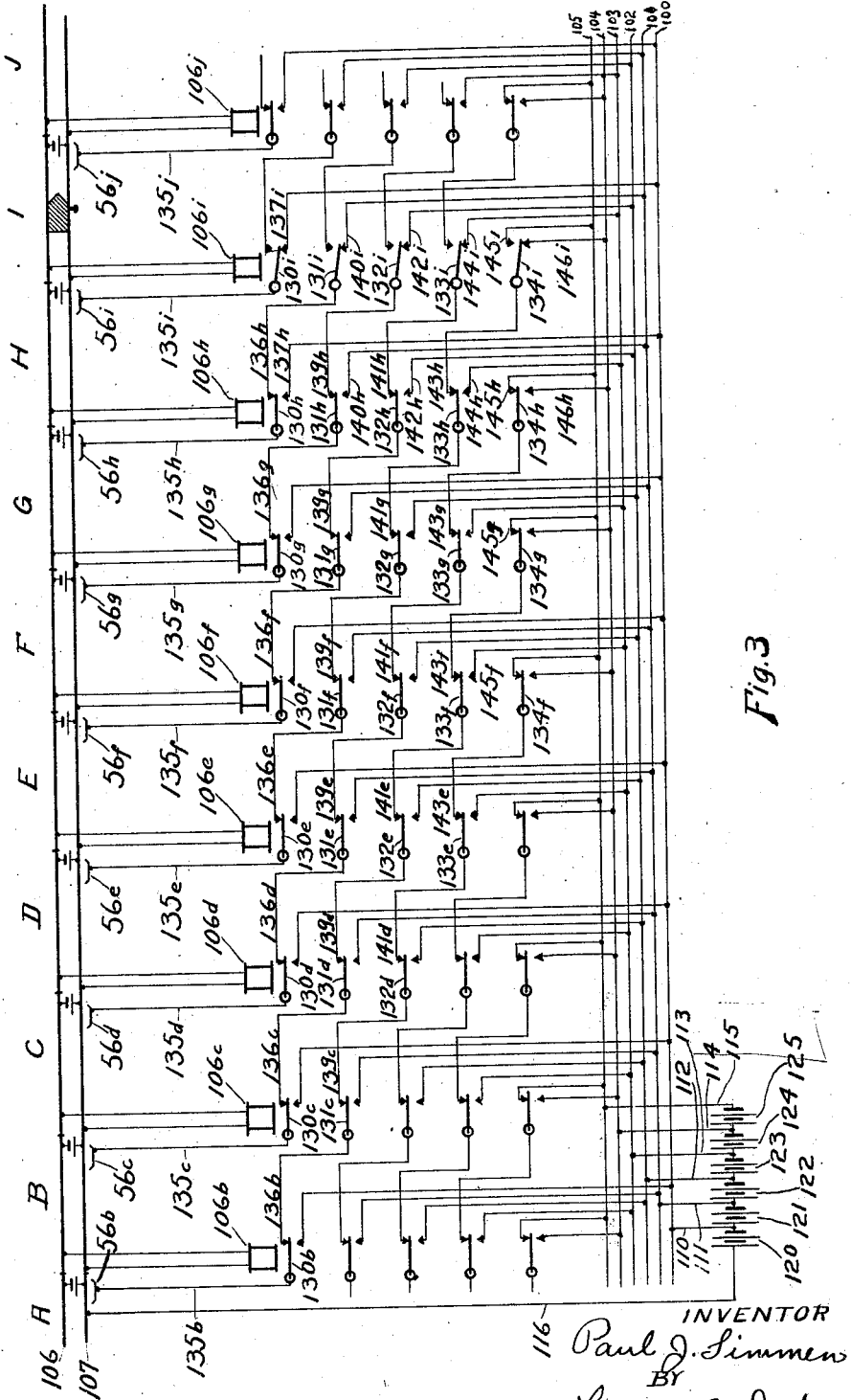

Oct. 13, 1931.     P. J. SIMMEN     1,827,407
AUTOMATIC SPEED CONTROL SYSTEM
Filed July 20, 1917     2 Sheets-Sheet 1
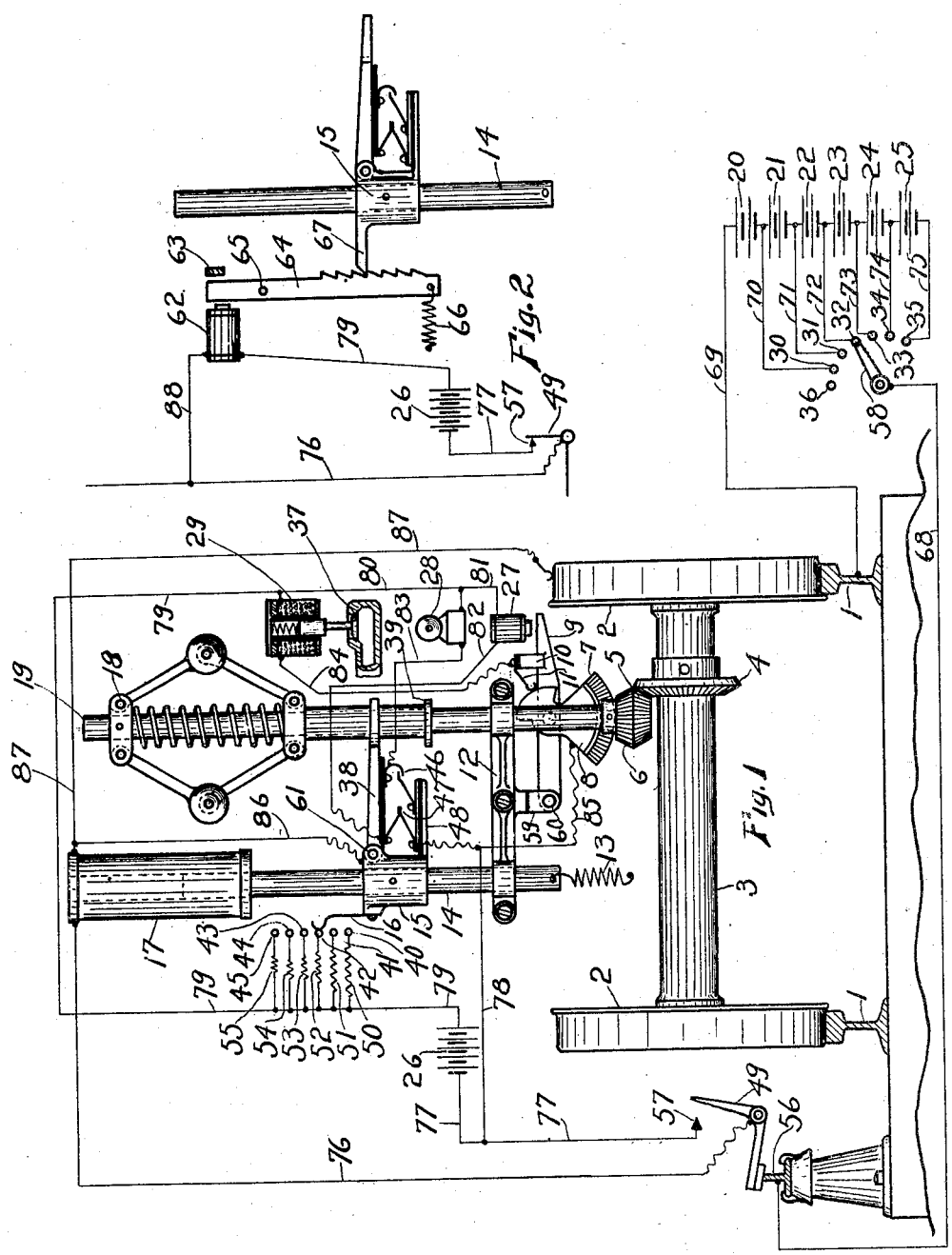
INVENTOR
Paul J. Simmen
BY
Lyman E. Dodge
ATTORNEY Oct. 13, 1931. P. J. SIMMEN 1,827,407
AUTOMATIC SPEED CONTROL SYSTEM
Filed July 20, 1917  2 Sheets-Sheet 2

INVENTOR
Paul J. Simmen
BY
Lyman E. Dodge
ATTORNEY

Patented Oct. 13, 1931

1,827,407

UNITED STATES PATENT OFFICE

PAUL J. SIMMEN, OF BUFFALO, NEW YORK, ASSIGNOR TO SIMMEN AUTOMATIC RAILWAY SIGNAL COMPANY, OF EDEN, NEW YORK, A CORPORATION OF ARIZONA

AUTOMATIC SPEED CONTROL SYSTEM

Application filed July 20, 1917. Serial No. 181,918.

This invention relates to automatic speed control systems for controlling the speed of moving vehicles.

The object of this invention is to provide a system by which the speed of a moving vehicle may be automatically controlled so as to prevent the vehicle from exceeding a speed which is safe for the particular condition of the track over which the vehicle is running. More specifically, this invention relates to a speed control device in which intermittent influences outside the vehicle set the vehicle speed control mechanism in various positions as the train moves along the trackway. After the train has passed the intermittent influence, devices on the vehicle operate to hold the speed control mechanism in the same position to which it has been set by the outside influence.

Other objects and advantages will appear as the description of the invention progresses, and the novel features will be particularly pointed out in the appended claims.

In describing the invention in detail, reference is had to the accompanying drawings, wherein I have illustrated a preferred physical embodiment of my invention, and wherein like characters of reference designate corresponding parts throughout the several views and in which—

Figure 1 is a diagrammatic view of the vehicle carried devices together with means for operating said devices. Fig. 2 is a detail view showing a modification of parts of the device shown in Fig. 1. Fig. 3 is a diagrammatic view of a trackway, having automatic means for operating the vehicle carried devices.

Referring to Fig. 1, 1, 1 are the rails upon which a vehicle is adapted to travel; 2, 2 are the wheels of the vehicle and 3 its axle. Rigidly mounted on the axle 3 is a bevel gear 4 which meshes with a bevel gear 5. The bevel gear 5 is rigidly attached to the upright shaft 19, which is suitably supported in a bearing which forms part of a bracket 12 which is mounted at a convenient place on the vehicle. Secured to the upper end of the shaft 19 is a centrifugal governor 18, the upper collar of said governor being rigidly secured to the shaft 19, and the lower collar of the said governor being adapted to move upward on the shaft 19, as the speed of the vehicle increases. The lower collar of the governor 18 has an annular flange 39, which is adapted, when the speed of the vehicle is high enough, to touch the forked member 38, which extends partially around said lower collar of the governor 18.

The forked member 38 is pivotally attached at the point 61 to a member 15, which is rigidly attached to a plunger 14. The plunger 14 is suitably supported in a bearing formed in the bracket 12, and the upper end of the plunger 14 acts as the core for the solenoid 17. The tension spring 13 has one end attached to the lower end of the plunger 14 and the other end fixed to a suitable point on the vehicle. Rigidly attached to the member 15 is a spring contact 16 which is adapted, as the plunger 14 moves up and down, to contact with the various contact points 40, 41, 42, 43, 44 and 45. When electric current is flowing in the solenoid 17, the solenoid attracts the plunger 14, and draws it up, against the tension of the spring 13. By applying various voltages to the solenoid 17, it is possible to raise the plunger 14 to various heights and thus cause the contact spring 16 to contact successively with contacts 40, 41, 42, 43, 44 and 45. As the member 15 is rigidly attached to the plunger 14, raising the plunger 14 results also in raising the forked arm 38. Rigidly secured to the member 15 and below the forked arm 38 is an arm 48. Mounted on and insulated from the arms 38 and 48 are two pairs of contact springs 46 and 47. Normally the contacts 46 do not make contact, while the contacts 47 do make contact.

49 is a contact shoe hingedly mounted at a convenient place on the vehicle and adapted to contact with a ramp rail 56 rigidly secured to the ties adjacent to the track rails. When the shoe 49 is in contact with such ramp rail 56, the shoe 49 breaks contact with its contact point 57, but when the vehicle has moved so that the shoe 49 is no longer in contact with a ramp rail 56, the shoe 49 is restored to contact with its contact point 57, by gravity or spring pressure.

37 is an air valve contained in the train line air pipe and normally held closed by the solenoid 29, whose core is attached to the stem of the air valve. When the solenoid 29 is energized its core is held in the upper position against the pressure of a compression spring, but when the solenoid 29 becomes deenergized, the compression spring forces the core and therefore the valve 37 to their lower position, thus allowing air to flow from the train pipe to the atmosphere and causing an application of the brakes. 28 is an electric bell or warning signal.

Extending downward from the member 12 and insulated therefrom is an arm 59 to which is pivotally attached an arm 9. Pivotally mounted on the arm 9 is a sector 8 whose lower end has a series of gear teeth 7, which are adapted under certain circumstances to mesh with a bevel gear 6 which is rigidly mounted on the shaft 19 adjacent to the bevel gear 5. The upper part of the sector 8 forms a surface which is adapted to be touched by a contact spring 11. The contact spring 11 is mounted on and insulated from a post 10 extending upwardly from the arm 9. The right hand end of the arm 9 acts as an armature for the electromagnet 27, which, when energized, holds the arm 9 in its upper position so that the teeth 7 are out of mesh with the bevel gear 6. However, when the electromagnet 27 is de-energized the arm 9 drops to its lower position and the teeth 7 then mesh with the bevel gear 6.

26 is a battery or other source of energy carried on the vehicle. 50, 51, 52, 53, 54 and 55 are resistances of different value, which are connected to the contact points 40, 41, 42, 43, 44 and 45 respectively. The parts described are suitably connected by electrical wires or conductors which will be more fully described in the description of operation hereinafter contained.

Located at a convenient place near the trackway are a series of batteries 20, 21, 22, 23, 24 and 25. The battery 20 has one terminal connected by the wire 69 to the track rail 1. The other terminal of the battery 20 is connected to the opposite terminal of the battery 21, and a wire 70 connects the connecting point of these two batteries with a contact point 30. The other terminal of the battery 21 is connected to the opposite terminal of the battery 22, and the wire 71 connects the connecting point of these two batteries with the contact point 31. Similarly all of these batteries 20, 21, 22, 23, 24 and 25 are connected in series and from the connecting point between each two batteries a wire runs to a contact point. The arm 58 is adapted to be moved to touch any of the contact points 30, 31, 32, 33, 34, 35, 36, and the arm 58 is connected by a wire 68 to the ramp rail 56. It will be seen by an inspection of this circuit that when the arm 58 is in contact with the contact point 36, there will be no difference of potential between the ramp 56 and the rail 1. When the arm 58 is in contact with the contact point 30 there will be a difference of potential between the ramp 56 and the rail 1, equal to the voltage of the battery 20. When the arm 58 is in contact with the contact point 31, the said difference of potential will be equal to the combined voltage of the batteries 20 and 21. When the arm 58 is in contact with the contact point 32, the said difference of potential will be equal to the combined voltage of the batteries 20, 21 and 22. When the arm 58 is in contact with the contact point 33, the said difference of potential will be equal to the combined voltage of the batteries 20, 21, 22 and 23. When the arm 58 is in contact with the contact point 34, the said difference of potential will be equal to the combined voltage of the batteries 20, 21, 22, 23 and 24, and when the arm 58 is in contact with the contact point 35, the said difference of potential will be equal to the combined voltage of the batteries 20, 21, 22, 23, 24 and 25.

The operation of this device is as follows: Assuming that the arm 58 is in contact with the contact point 35, there will be a difference of potential between the ramp 56 and the rail 1 corresponding to the combined voltage of the batteries 20, 21, 22, 23, 24, and 25. This will cause current to flow from the batteries through the shoe 49, wire 76, solenoid 17, wire 87, the wheels 2, rail 1 and back to the batteries. The solenoid 17 will therefore be energized by the maximum voltage, and the plunger 14 will be drawn to its highest position so that contact spring 16 will touch the contact point 45. When the vehicle moves forward so that the shoe 49 no longer touches the ramp 56, the shoe will be restored to contact with its contact point 57 and the solenoid 17 will remain energized through the following circuit: From the positive side of the battery 26 to the wire 77, contact 57, shoe 49, wire 76, solenoid 17, wire 86, member 15, contact spring 16, contact point 45, resistance 55, wire 79 to the negative side of the battery 26. The resistance 55 is so proportioned that when the last described circuit is closed, substantially the same amount of current flows through the solenoid 17 as flowed through it when the shoe 49 was standing on the ramp 56 and the outside circuit was closed. The plunger 14 is therefore held in the same position to which it was set when the shoe was in contact with the ramp.

Assuming now that the arm 58 is in contact with the contact point 34 and that the shoe 49 is in contact with the ramp 56, the difference of potential between the ramp 56 and rail 1 will now be less than it was before. In other words, it will be equal to the combined voltage of the batteries 20, 21, 22, 23 and 24. Through the same circuit which was heretofore described, the solenoid 17 will be energized, but the current flow through the solenoid will be only sufficient to raise its plunger 14 so that the contact spring 16 is in contact with the contact point 44. When the vehicle has moved so that its shoe 49 is no longer in contact with the ramp 56, the shoe 49 will again make contact with its contact point 57, the solenoid 17 will remain energized through the following circuit: From the positive side of the battery 26 to the wire 77, contact 57, shoe 49, wire 76, solenoid 17, wire 86, member 15, contact spring 16, contact point 44, resistance 54, wire 79 to the negative side of the battery 26. It will be noted that this holding circuit differs from the one heretofore described only in the substitution of the resistance 54 for the resistance 55. The resistance 54 is so proportioned that the current flow through the solenoid 17 due to the holding circuit, is substantially the same as the current flow when the shoe 49 was in contact with the ramp 56, and the plunger 14 will therefore be retained in the same position to which it was set when the shoe was in contact with the ramp.

Similarly when the arm 58 is in contact with the contact point 33 and the shoe 49 is in contact with the ramp 56, the solenoid 17 will be energized by a still lower voltage namely—the combined voltage of the batteries 20, 21, 22 and 23, and the plunger 14 will be moved to such a position that contact spring 16 will contact with the contact point 43. When the vehicle moves so that the shoe 49 is no longer in contact with the ramp 56, the holding circuit for the solenoid 17 will then be closed through the resistance 53, which will allow a current flow sufficient to maintain the plunger 14 in the same position to which it was set when the shoe was on the ramp.

When the arm 58 is in contact with the contact point 32 and the shoe is on the ramp, the plunger 14 will be moved to such a position that the contact spring 16 will contact with the contact point 42. When the vehicle moves so that the shoe has left the ramp, the holding circuit will then be closed through the resistance 52 and the plunger will remain in the same position to which it was set when the shoe was in contact with the ramp.

When the arm 58 is in contact with the contact point 31, and the shoe is on the ramp, the plunger 14 will be moved to such a position that the contact spring 16 will touch the contact point 41. When the vehicle has moved to such a position that the shoe is no longer contacting with the ramp a holding circuit will be closed which includes the resistance 51 and the plunger 14 will be maintained in the same position to which it was set when the shoe was in contact with the ramp.

When the arm 58 is in contact with the contact point 30 and the shoe is in contact with the ramp, the plunger 14 will be moved in such a position that the contact spring 16 touches the contact point 40. When the vehicle has moved so that the shoe no longer touches the ramp a holding circuit will be closed which includes the resistance 50, and the plunger 14 will be maintained in the same position to which it was set when the shoe was contacting with the ramp.

When the arm 58 is touching the contact 36 and the shoe is in contact with the ramp, no current will flow through the solenoid 17 and the plunger 14 will drop to its lowest position. In this position the contact spring 16 does not touch any of the contacts 40, 41, 42, 43, 44 or 45. When the vehicle has moved so that the shoe is no longer in contact with the ramp, no holding circuit will be closed and the plunger 14 will therefore remain in its lowest position.

The electromagnet 29 which governs the air valve 37 is normally energized through the following circuit: From the positive side of the battery 26 to the wires 77, 78 and 85, sector 8, contact spring 11, wire 84, coil 29, wire 79 to the negative side of the battery 26. The electromagnet 27 is normally energized through the following circuit: From positive side of the battery 26 to the wires 77 and 78, contacts 47, wire 82, magnet 27, wires 81, 80 and 79 to the negative side of the battery 26.

It will be noted that when the plunger 14 moves to its various positions the forked arm 38 is also correspondingly moved. The annular ring 39 which forms the lower part of the governor collar is moved up and down as the speed of the vehicle increases and decreases. When the plunger 14 is in its lowest position, the arm 38 is touching the collar 39 and any movement of the vehicle will result in revolving the arm 38 about its pivot 61. When the plunger 14 is in in such a position that the contact spring 16 is touching the contact point 40, the arm 38 will be somewhat higher and will permit a limited speed of the vehicle before the arm 38 is rotated about its pivot 61 by the collar 39. As the plunger 14 is moved to successively higher positions the vehicle may move at correspondingly higher speeds before the arm 38 will be rotated about its pivot 61 by the collar 39.

The effect of rotating the arm 38 about its pivot 61 is as follows: First, the contacts 46 touch and the warning signal circuit is closed as follows: From the positive side of the battery 26 to the wires 77 and 78, contacts 46, wire 83, warning signal 28, wires 80 and 79 to the negative side of the battery 26. A further movement of the arm 38 causes the contacts 47 to break contact and this opens the normally closed circuit for the electromagnet 27. When the electromagnet 27 is de-energized the arm 9 drops as heretofore described and the teeth 7 mesh with the gear 6. After the vehicle has moved a predetermined distance with the teeth 7 in mesh with the gear 6, the sector 8 is moved so that it no longer makes contact with the contact spring 11. This opens the normally closed circuit for the electromagnet 29 and an automatic application of the brakes take place.

It will be noted that the arm 38 constitutes a permissible speed device which may be set in a plurality of different permissible speed positions by intermittent devices along the trackway and maintained by devices on the vehicle in the position in which it has been set by the devices outside the vehicle. When the vehicle exceeds the permissible speed for which the arm 38 is set, a warning signal is sounded and the engineer should apply his brakes. If, however, he fails to do so, the distance device 8 is actuated shortly after the warning signal begins to sound and after the train has travelled a predetermined distance the brakes are automatically applied.

In Fig. 2 there is shown a modification of the means of maintaining the plunger 14 in the position to which it is set by the outside devices. The member 15 is provided with a projecting dog 67, which is adapted to be engaged by one of a series of teeth on a member 64. The member 64 is pivotally mounted at 65 and its upper end constitutes the armature of an electromagnet 62. When the electromagnet 62 is energized the member 64 is moved so that one of its teeth is in engagement with the dog 67, and when the electromagnet 62 is de-energized, the member 64 is drawn by a tension spring 66 attached to its lower end into such a position that its upper end is resting against the stop 63 and its teeth no longer engage the dog 67. The electromagnet 62 is energized, whenever the shoe 49 is not resting on a ramp, through the following circuit: From the positive side of the battery 26, to the wire 77, contact 57, shoe 49, wires 76 and 88, electromagnet 62, wire 79 to the negative side of the battery 26. When the shoe 49 is standing on a ramp this circuit is broken at the contact 57.

It will be observed that the operation of this device is as follows: When the shoe 49 is standing on a ramp, the electromagnet 62 is de-energized and the member 64 is drawn to such a position that the plunger 14 is free to be moved to any position. Upon leaving the ramp the circuit of the electromagnet 62 is closed and the member 64 holds the plunger 14 in whatever position it has been placed by the outside devices.

In Fig. 3 there are shown means for automatically actuating the speed control device of Fig. 1 so as to provide a varying zone of influence behind a train moving along a trackway, so that a following train will be forced to gradually reduce its speed as it approaches the first mentioned train. 106 and 107 are the rails of the track, the rail 107 being a continuous rail and the rail 106 being divided by suitable insulating joints into blocks A, B, C, D, E, F, G, H, I and J. Located at a suitable place along the trackway are the batteries 120, 121, 122, 123, 124, 125. Running adjacent to the trackway are the line wires 100, 101, 102, 103, 104, 105. The battery 120 has one terminal connected by the wire 116 to the continuous track rail 107. The other terminal of the battery 120 is connected to the opposite terminal of the battery 121, and connected to the connecting point of these two batteries is the wire 110, whose other end is connected to the line wire 100. The other batteries 121, 122, 123, 124, 125 are similarly connected so that the result is as follows: The difference of potential between line wire 100 and the track rail 107 is equal to the voltage of the battery 120; the difference of potential between the line wire 101 and the track rail 107 is equal to the combined voltage of the batteries 120 and 121; the difference of potential between the line wire 102 and the track rail 107 is equal to the combined voltage of the batteries 120, 121 and 122; the difference of potential between the line wire 103 and the track rail 107 is equal to the combined voltage of the batteries 120, 121, 122 and 123, etc.

Each of the blocks has a track battery at one end connected across the track rails and at the other end a track relay. As all of the blocks are identical, I will merely describe the devices connected with the block H. The track relay for this block is 106$h$. This relay has five neutral armatures 130$h$, 131$h$, 132$h$, 133$h$ and 134$h$. Each of these armatures has a front contact adapted to be touched by the armature when the relay is energized, and a back contact adapted to be touched by the armature when the relay is de-energized. The armature 130$h$ is connected by a wire 135$h$ with a ramp or signal rail 56$h$ located adjacent to the entrance to the block H. The front contact of the armature 130$h$ is connected by a wire 136$h$ to the armature 131$i$. The back contact of the armature 130$h$ is connected by a wire 137$h$ with the line wire 100. The front contact of the armature 131$h$ is connected by a wire 139$h$ with the armature 132$i$. The back contact of the armature 131$h$ is connected by a wire 140$h$ with the line wire 101. The front contact of the armature 132$h$ is connected by a wire 141$h$ with the armature 133$i$. The back contact of the armature 132$h$ is connected by a wire 142$h$ with the line wire 102. The front contact of the armature 133$h$ is connected by a wire 143$h$ with the armature 134$i$. The back contact of the armature 133h is connected by a wire 144h with the line wire 103. The front contact of the armature 134h is connected by a wire 145h with the line wire 105. The back contact of the armature 134h is connected by a wire 146h with the line wire 104.

Assuming that a train is in the block I, the various signal rails behind this train will be connected to the various line wires as follows: The signal rail 56i will be connected to the line wire 100 as follows: From the signal rail 56i to the wire 135i, armature 130i, back contact of said armature, wire 137i to the line wire 100. The signal rail 56h will be connected to the line wire 101 as follows: From the signal rail 56h to the wire 135h, armature 130h, front contact, wire 136h, armature 131i, back contact, wire 140i to the line wire 101. The signal rail 56g will be connected to the line wire 102 as follows: From the signal rail 56g to the wire 135g armature 130g, front contact, wire 136g, armature 131h, front contact, wire 139h, armature 132i, back contact, wire 142i to the line wire 102. The signal rail 56f will be connected to the line wire 103 as follows: From the signal rail 56f to the wire 135f, armature 130f, front contact, wire 136f, armature 131g, front contact, wire 139g, armature 132h, front contact, wire 141h, armature 133i, back contact, wire 144i to the line wire 103. The signal rail 56e will be connected to the line wire 104 as follows: From the signal rail 56e to the wire 135e, armature 130e, front contact, wire 136e, armature 131f, front contact wire 139f, armature 132g, front contact, wire 141g, armature 133h, front contact, wire 143h, armature 134i, back contact, wire 146i to the line wire 104. The signal rail 56d will be connected to line wire 105, as follows: From the signal rail 56d to the wire 135d, armature 130d, front contact, wire 136d, armature 131e, front contact, wire 139e, armature 132f, front contact, wire 141f, armature 133g, front contact, wire 143g, armature 134h, front contact, wire 145h to the line wire 105. Similarly the signal rails 56c and 56b will be connected to the line wire 105.

It will be obvious that if the assumed train remains in the block I, a second train approaching the said first mentioned train will at the entrance to blocks B, C, and D have its permissible speed device 38 set in the maximum position. As the train progresses along the trackway and passes over the various signal rails 56e, 56f, 56g, 56h and 56i each of which is connected with a source of energy of lower voltage than the preceding one, the permissible speed device 38 will at the entrance to each block be moved to a lower position and maintained at that position as the train moves through the block. This will force the train to make successive reductions in speed as it approaches nearer and nearer to the preceding train. The speed at which the second train will be allowed to enter the occupied block I would be so low that it would eliminate the possibility of a collision with the train in advance.

Although I have particularly described the construction of one physical embodiment of my invention and explained the operation and principle thereof, nevertheless, I desire to have it understood that the form selected is merely illustrative but does not exhaust the possible physical embodiments of the idea of means underlying my invention.

What I claim as new and desire to secure by Letters Patent of the United States, is:

1. In a speed control system for railway vehicles, a track, a vehicle thereon, a permissible speed device on the vehicle, an actual speed device on the vehicle, intermittent means along the trackway for setting said permissible speed device in a plurality of different permissible speed positions, means including electrical devices on the vehicle for maintaining said device in the position in which it has been set by the means along the trackway after the vehicle has passed said means, means for retarding the vehicle, and slow acting means for actuating the retarding means when the actual speed of the vehicle exceeds the permissible speed at which the permissible speed device is set.

2. In a speed control system for railway vehicles, a track, a single rail located adjacent to the track rails, a vehicle adapted to move along the track, a permissible speed device on the vehicle, a contact shoe on the vehicle adapted to contact with the signal rail, means for energizing the signal rail with current of different voltages, means for moving the permissible speed device to a plurality of different positions while the shoe is in contact with the signal rail, the position of the permissible speed device depending upon the voltage supplied to the signal rail, and means for maintaining the permissible speed device in the position in which it has been set when the shoe was in contact with the signal rail, after said shoe leaves the signal rail.

3. In a speed control system for railway vehicles, a track, a vehicle thereon, a permissible speed device on the vehicle, an actual speed device on the vehicle, a warning signal, a distance element, intermittent means along the trackway for setting said permissible speed device in a plurality of different permissible speed positions, means on the vehicle for maintaining said device in the position in which it has been set by the means along the trackway after the vehicle has passed said means, means for successively operating the warning signal and actuating the distance element when the actual speed of the vehicle exceeds the permissible speed at which the permissible speed device is set, means for moving the distance element in accordance with the distance travelled by the vehicle, means for retarding the vehicle, and means for actuating the retarding means after the vehicle has travelled a predetermined distance beyond the point at which the distance element was actuated.

4. In a speed control system for railway vehicles, a track, a vehicle thereon, a permissible speed device on the vehicle, an electromagnet adapted to move the permissible speed device to various permissible speed positions, corresponding to different voltages applied to the electromagnet, means for intermittently connecting the electromagnet with circuits partially outside the vehicle, said circuits being supplied with different voltages, a holding circuit on the vehicle including a source of energy and said electromagnet, said holding circuit being closed when the electromagnet is not connected with an outside circuit, and means for varying the voltage applied to the electromagnet through the holding circuit, said means being so arranged that the voltage applied to the electromagnet through the holding circuit at any given time will be substantially equal to the voltage applied to the electromagnet when last connected to an outside circuit.

5. In a speed control system for railway vehicles, a track, a vehicle thereon, a permissible speed device on the vehicle, an electromagnet adapted to move the permissible speed device to various permissible speed positions, corresponding to different voltages applied to the electromagnet, means for intermittently connecting the electromagnet with circuits partially outside the vehicle, said circuits being supplied with different voltages, and means on the vehicle, including an electro-mechanical lock, for holding the permissible speed means in the position in which it was set when its operating electromagnet was last connected to an outside circuit.

6. In a speed control system for railway vehicles, a track, a vehicle thereon, a permissible speed device on the vehicle, an actual speed device on the vehicle, a warning signal, a distance element, means for setting said permissible speed device in a plurality of permissible speed positions, means for successively operating the warning signal and actuating the distance element when the actual speed of the vehicle exceeds the permissible speed at which the permissible speed device is set, means for moving the distance element in accordance with the distance travelled by the vehicle, means for retarding the vehicle, and means for actuating the retarding means after the vehicle has travelled a predetermined distance beyond the point at which the distance element was actuated.

7. In a speed control system for railway vehicles, a trackway divided into blocks, a signal rail at the entrance to each block, means responsive to the presence of a vehicle in any block for energizing the signal rails in the rear thereof with energy of different voltages, the voltage applied to a given rail being proportional to its distance from the vehicle, and a permissible speed device on a following vehicle adapted to be set to and maintained at a permissible speed position corresponding to the voltage of the signal rail at the entrance to the block said vehicle is occupying.

8. In a speed control system for railway vehicles, a trackway divided into blocks, a signal rail at the entrance to each block, means responsive to the presence of a vehicle in any block for energizing the signal rails in the rear thereof with energy of different voltages, the voltage applied to a given signal rail being proportional to its distance from the vehicle, a permissible speed device on a following vehicle adapted to be set to different permissible speed positions as the vehicle passes the signal rails, the position to which said device is set corresponding to the voltage applied to the signal rail, and means on the vehicle for maintaining the permissible speed device in the same position to which it was set by the last signal rail passed by the vehicle, after the vehicle has passed said signal rail.

9. In a speed control system for railway vehicles; in combination; a trackway; a vehicle thereon; means on the vehicle moved in correspondence with the actual speed; means along the trackway; means on the vehicle moved by the last mentioned means in correspondence with permissible speed; means on the vehicle controlling the speed thereof; means for governing said last mentioned means and means controlled by the cooperation of the actual speed means and the permissible speed means for setting said last mentioned means in operation, said last mentioned means thus set in operation including a device responsive to the movement of the vehicle for determining the distance of travel of the vehicle before a control of the speed thereof will be effectuated after the actual speed means and the permissible speed means have cooperated to effect their function.

10. In a speed control system for railway vehicles, in combination; a trackway; a vehicle thereon; means on the vehicle moved in correspondence with the actual speed; means along the trackway; means on the vehicle moved by the last mentioned means in correspondence with permissible speed; means on the vehicle controlling the speed thereof; means for governing said last mentioned means; means controlled by the cooperation of the actual speed means and the permissible speed means for setting said last mentioned means in operation, said last mentioned means thus set in operation including a device responsive to the movement of the vehicle for determining the distance of travel of the vehicle before a control of the speed thereof will be effectuated after the actual speed means and the permissible speed means have cooperated to effect their function and means for giving an alarm at the moment the actual speed means and the permissible speed means cooperate to effect their function.

11. In a speed control system for railway vehicles, in combination: a trackway; a vehicle thereon; a permissible speed device on the vehicle; an actual speed device on the vehicle; means along the trackway for setting said permissible speed device in a plurality of different permissible speed positions; means on the vehicle for maintaining said device in the position in which it has been set by the means along the trackway after the vehicle has passed said means; means for retarding the vehicle, and means moved by the movement of the vehicle for actuating the retarding means when the actual speed of the vehicle exceeds the permissible speed at which the permissible speed device is set.

12. In a speed control system for railway vehicles, in combination: a trackway; means dividing the trackway into track circuited sections each including a relay; signal rails disposed at intervals along the trackway; means controlled by the relays for impressing current of corresponding characteristic upon each signal rail when the trackway is free of vehicles or in normal condition and means for impressing currents of a varying characteristic upon the signal rails in proportion to their distance from the rear of a vehicle when a vehicle is on the trackway or an abnormality occurs in any section.

PAUL J. SIMMEN.